(12) United States Patent
Jeon et al.

(10) Patent No.: US 8,211,584 B2
(45) Date of Patent: Jul. 3, 2012

(54) METAL SEPARATOR FOR FUEL CELL AND FUEL CELL STACK HAVING THE SAME

(75) Inventors: Yoo Taek Jeon, Yongin-shi (KR); Ki Jung Kim, Yongin-shi (KR); Jong-Chan Lee, Anseong-shi (KR); Yeon Soo Jeong, Yongin-shi (KR)

(73) Assignee: Hyundai Hysco, Ulsan (KR)

( * ) Notice: Subject to any disclaimer, the term of this patent is extended or adjusted under 35 U.S.C. 154(b) by 524 days.

(21) Appl. No.: 12/445,576

(22) PCT Filed: Jun. 4, 2007

(86) PCT No.: PCT/KR2007/002704
§ 371 (c)(1),
(2), (4) Date: Apr. 14, 2009

(87) PCT Pub. No.: WO2008/047989
PCT Pub. Date: Apr. 24, 2008

(65) Prior Publication Data
US 2010/0028742 A1 Feb. 4, 2010

(30) Foreign Application Priority Data

Oct. 16, 2006 (KR) .................. 10-2006-0100502
Jan. 22, 2007 (KR) .................. 10-2007-0006475

(51) Int. Cl.
*H01M 2/38* (2006.01)
(52) U.S. Cl. ............ 429/457; 429/514; 429/518
(58) Field of Classification Search .......... 429/444, 429/455–661
See application file for complete search history.

(56) References Cited

U.S. PATENT DOCUMENTS

| | | | |
|---|---|---|---|
| 5,300,370 | A | 4/1994 | Washington et al. |
| 5,942,347 | A | 8/1999 | Koncar et al. |
| 6,261,710 | B1 | 7/2001 | Marianowski et al. |
| 6,607,857 | B2 | 8/2003 | Blunk et al. |
| 6,924,052 | B2 | 8/2005 | Lee |
| 2004/0048126 | A1 | 3/2004 | Shibata et al. |
| 2004/0106028 | A1 | 6/2004 | Sugiura et al. |
| 2004/0151975 | A1 | 8/2004 | Allen |
| 2004/0219410 | A1 * | 11/2004 | Tanaka et al. ............ 429/26 |
| 2006/0099779 | A1 * | 5/2006 | Cayrefourcq et al. ...... 438/486 |
| 2006/0110646 | A1 * | 5/2006 | Suenaga et al. ............ 429/35 |

FOREIGN PATENT DOCUMENTS

| | | |
|---|---|---|
| EP | 1 557 894 A1 | 7/2005 |
| JP | 2001266911 A | 9/2001 |

OTHER PUBLICATIONS

International Search Report for application PCT/KR2007/002704 filed Jun. 4, 2007.

* cited by examiner

*Primary Examiner* — Thanhha Pham

(57) ABSTRACT

The present invention discloses a metal separator for a fuel cell including a reaction gas channel formed to protrude from a first face of the metal separator to a second face thereof, a coolant channel formed between the reaction gas channels protruding from the second face of the metal separator, a reaction gas manifold opened to introduce a reaction gas into the metal separator, a coolant manifold opened to introduce a coolant into the metal separator, and a stepped portion positioned at any one of the space between the reaction gas channel and the reaction gas manifold, and the reaction gas channel. This configuration serves to widen the reaction gas flowing portion and the coolant flowing portion on the metal separator, and prevent deformation of the reaction gas flowing portion and the coolant flowing portion, thereby improving efficiency of the fuel cell.

18 Claims, 7 Drawing Sheets

[Fig. 1]
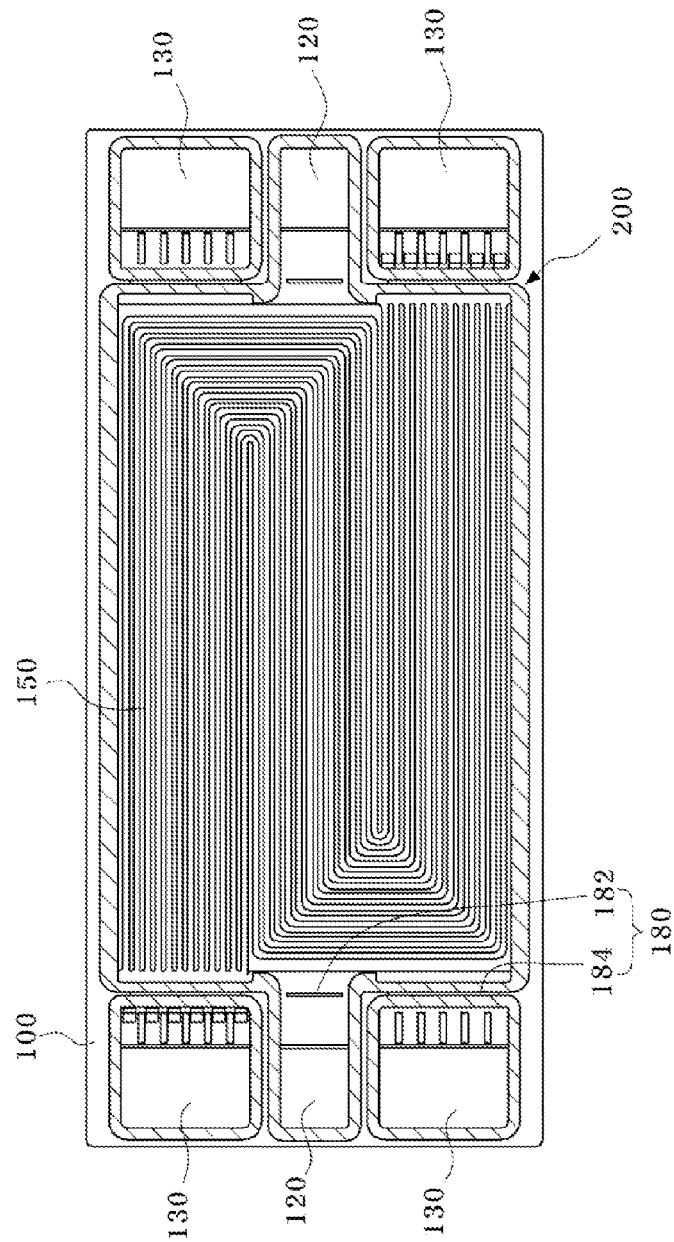

[Fig. 2]
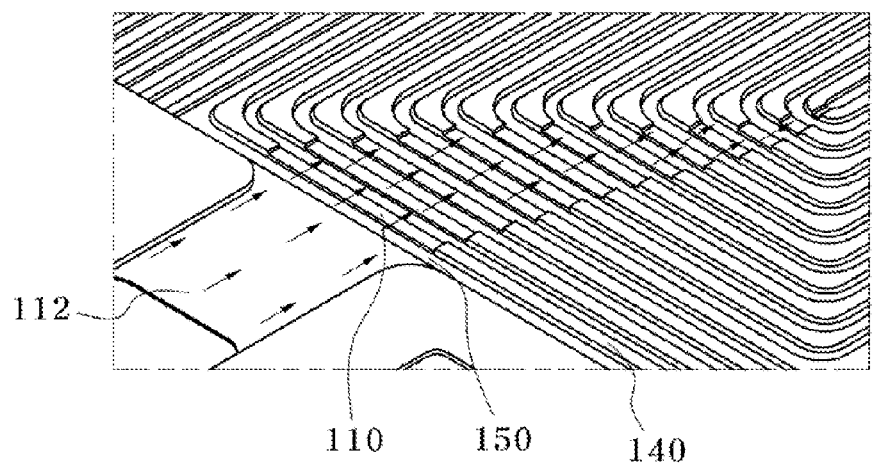
[Fig. 3]
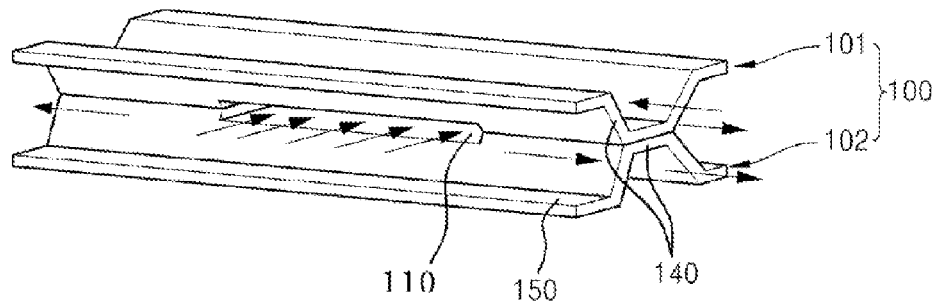

[Fig. 4]
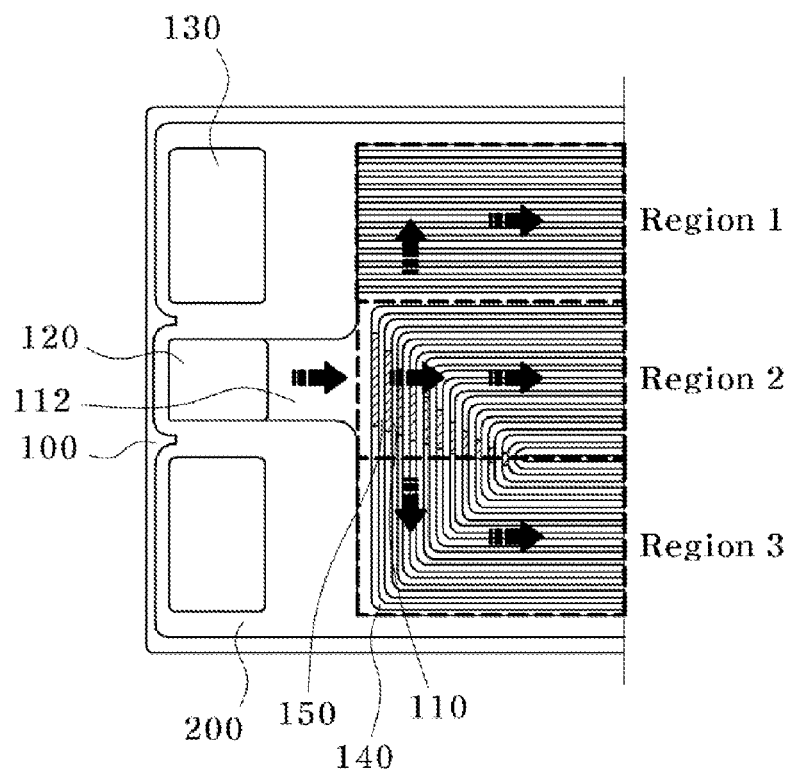

[Fig. 5]
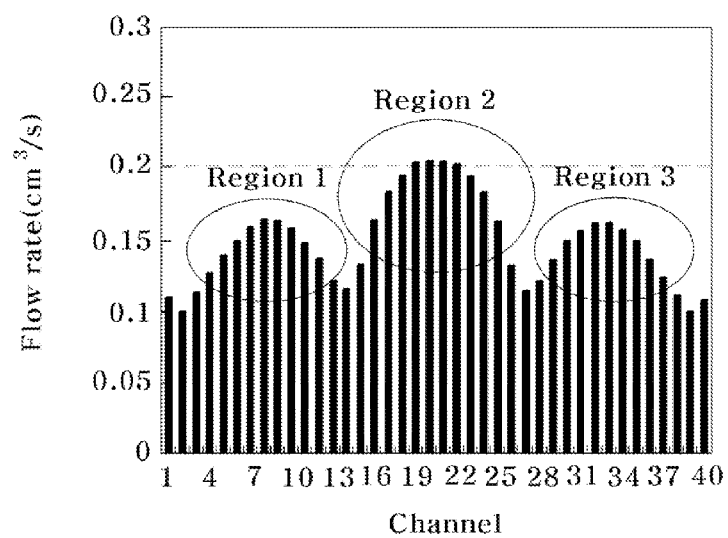

[Fig. 6]
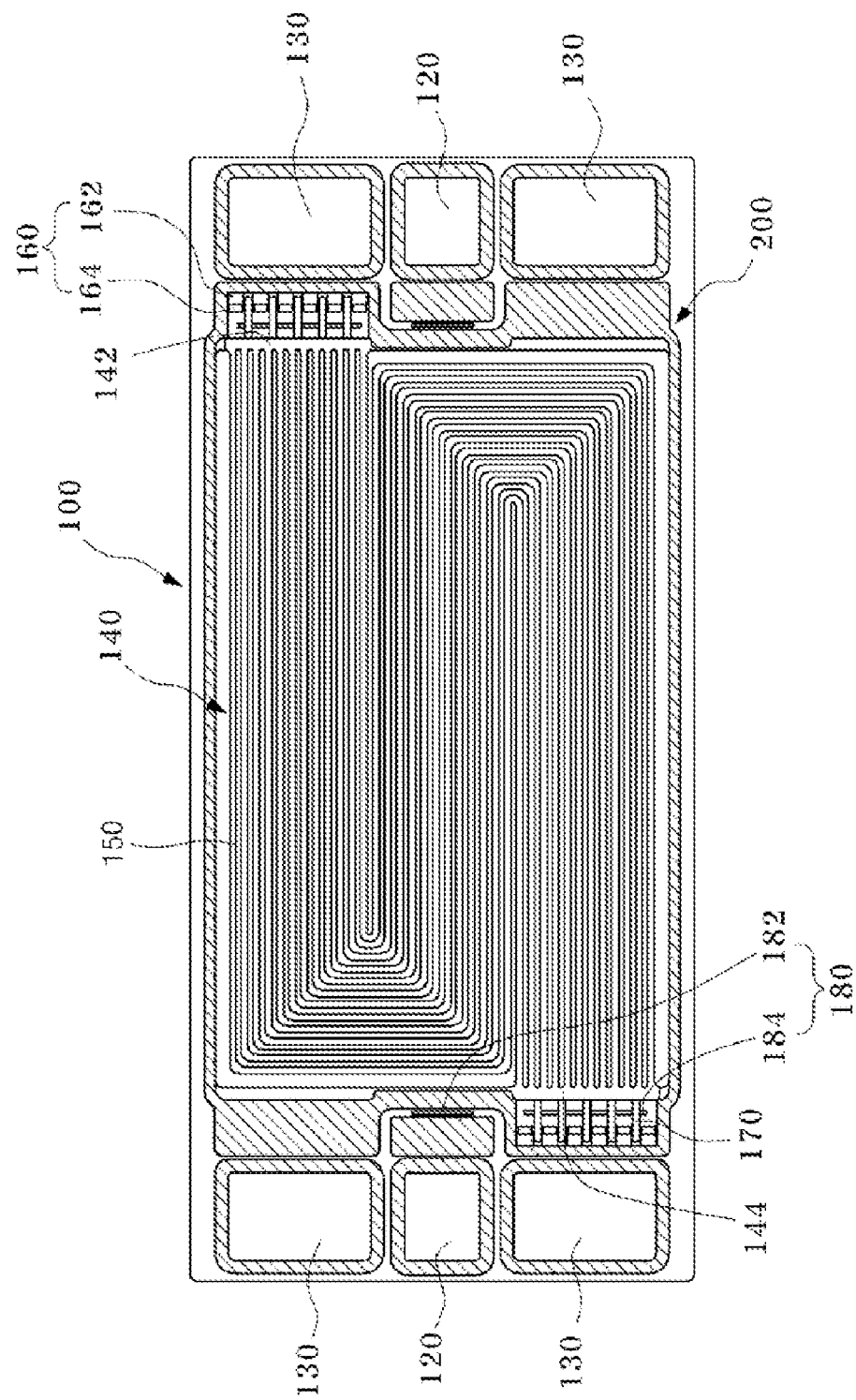

[Fig. 7]
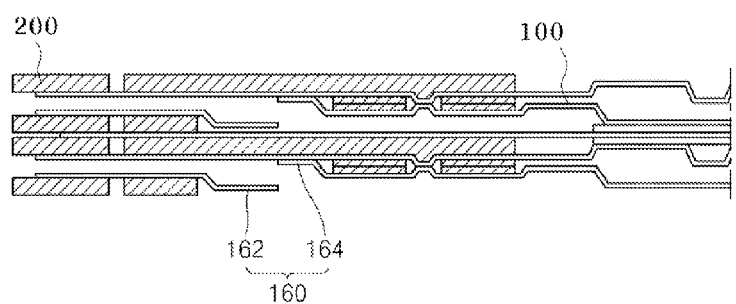

[Fig. 8]
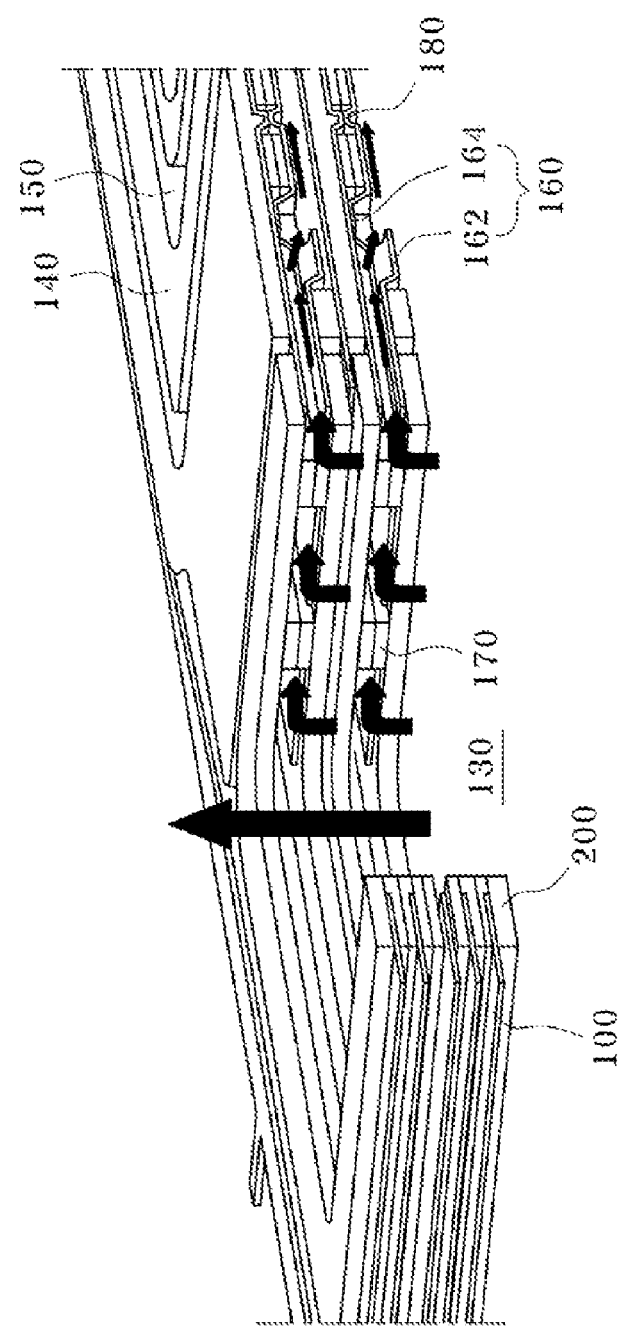

METAL SEPARATOR FOR FUEL CELL AND FUEL CELL STACK HAVING THE SAME

TECHNICAL FIELD

The present invention relates to a metal separator for a fuel cell and a fuel cell stack having the same, and more particularly, to a metal separator for a fuel cell which includes a reaction gas channel and a coolant channel and which further includes a coolant inlet and outlet connecting the coolant channels, and a fuel cell stack having the same.

In addition, the present invention relates to a metal separator for a fuel cell which includes a structure of preventing deformation of a reaction gas inflow portion, and a fuel cell stack having the same.

BACKGROUND ART

In general, a fuel cell is an electricity generation apparatus for converting chemical energy into electric energy by using the oxidization and deoxidization of hydrogen and oxygen. Hydrogen is oxidized at an anode to be separated into hydrogen ions and electrons. While the hydrogenions are transferred to a cathode through an electrolyte, the electrons are transferred to the cathode through a circuit. The deoxidization occurs at the cathode. That is, the hydrogen ions, electrons and oxygen react with each other to generate water.

An amount of water contained in a polymer electrolyte membrane of the fuel cell, particularly, a polymer electrolyte membrane fuel cell (PEMFC) is one of the important factors deciding the performance of the fuel cell. It is because water serves as a medium transferring hydrogen ions to the cathode.

In addition to water, a temperature must be carefully controlled. When a reaction occurs in the fuel cell, a lot of heat is generated due to an activation loss, deoxidization at the cathode, and Joule heating. While activating a catalyst, such heat accelerates moisture reduction of the electrolyte membrane, to reduce ion conductivity. If the electrolyte membrane is exposed to a high temperature for a long time, durability of the electrolyte membrane decreases. Accordingly, besides the water management and the durability improvement, the temperature control is also an important factor deciding the performance of the fuel cell.

Normally, a cooling method using a coolant is employed to control the temperature of the fuel cell. A conventional fuel cell uses a separator made of a graphite material or a metal material. While a coolant channel is formed on the graphite separator by milling processing, it is formed on the metal separator by press processing. Passages of a reaction face and a cooling face can be individually manufactured on the graphite separator.

However, a reaction gas channel is stamp-processed on the metal separator, and its shape is reflected onto the opposite face as it is. It is thus difficult to individually form a passage of a coolant. Furthermore, the coolant channel is narrow and crooked, so that the coolant cannot smoothly flow in or out.

In order to solve the foregoing problems, a structure of introducing a coolant by forming a buffering region between a manifold and a channel is used to smoothly introduce the coolant into the metal separator which does not have a special coolant inflow structure. Nevertheless, the coolant does not flow well into the middle portion of the separator accumulating a lot of heat. In addition, the buffering region increases the size of the separator.

U.S. Pat. No. 6,924,052 discloses a separator having a cooling passage formed by etching. A large amount of coolant can be introduced into the middle portion of the separator accumulating relatively more reaction heat.

However, a high density of metal increases a weight of a stack. Meanwhile, a cooling fin can be applied to a separator. But, it increases a volume of a stack. As a plurality of separators overlap with each other, the production cost also increases. On the other hand, a thin plate can be installed between separators. However, it increases the cost and causes the structural difficulty in stack lamination.

The fuel cell includes a few components such as a membrane-electrode assembly (MEA) in which an electrochemical reaction occurs, a gas diffusion layer (GDL) which is a porous medium evenly dispersing a reaction gas onto the face of the MEA, and a separator for supporting the MEA and the GDL, delivering the reaction gas and the coolant, and collecting and transferring the generated electricity. A few tens to hundreds of components are laminated to form a fuel cell stack. An electricity generation capacity of the fuel cell increases in proportion to a reaction area of the MEA and a lamination amount of the stack. During the electricity generation of the fuel cell, hydrogen, oxygen and coolant are continuously supplied to each face of the MEA, GDL and separator. Keeping airtightness to prevent mixture of each reaction gas and the coolant is one of the most important factors in the operation of the fuel cell system.

Most of the polymer electrolyte fuel cells form an airtight structure by installing a gasket at both faces of a separator. In the case that the gasket is installed to attain airtightness, a predetermined fastening pressure is applied to the fuel cell stack to improve airtightness and electric conductivity. When such a load is applied, the GDL and the gasket are mostly deformed to obtain airtightness and electric conductivity. However, in the case of a metal separator manufactured by thin plate molding, a predetermined fastening pressure deforms part of the metal separator as well as the gasket. Particularly, the inflow portions of the reaction gas and the coolant are easily deformed due to the absence of a support member in the gasket portion and the fluid flowing portion.

Such deformation interrupts inflow of the reaction gas and the coolant, and thus applies many loads to peripheral devices, particularly, to a blower or a pump. As a result, efficiency of the system is reduced.

In the conventional fuel cell stack, the reaction gas such as a fuel gas and a deoxidization gas flows into both faces of the MEA. The metal separator separates the fuel gas, the deoxidization gas and the coolant so as to form the fuel cell stack by connecting unit cells. Here, the gasket seals up the structure to prevent leakage of the reaction gas and the coolant. As different from the graphite separator, the metal separator manufactured by thin plate molding inevitably has a complicated reaction gas inflow structure from a reaction gas manifold to a reaction gas channel so as to attain airtightness between the reaction gas and the coolant.

In order to solve the above problems, US Laid-Open Patent Gazette 20040219410 suggests a technique of coating a deformation prevention gasket on a deformation occurring portion. However, the gasket cannot completely support compression by a load. If the gasket is separated to block a reaction gas inflow portion, resistance may increase in inflow of a reaction gas.

US Laid-Open Patent Gazette 2001266911 discloses a technique of minimizing deformation of a space by adhering a metal plate. As it is difficult to mount one metal separator on the other, a manufacturing process of the metal separator is complicated. Furthermore, the added metal plate increases a weight of a stack, thereby applying many loads to a fuel cell system mounted apparatus.

DISCLOSURE OF INVENTION

Technical Problem

An object of the present invention is to provide a metal separator for a fuel cell which can be minimized in size and improve the cooling performance, and a fuel cell stack having the same.

Another object of the present invention is to provide a metal separator for a fuel cell which can facilitate inflow and outflow of a coolant through a structure manufactured by a simple molding process, and a fuel cell stack having the same.

Yet another object of the present invention is to provide a metal separator for a fuel cell which can efficiently cool the middle portion of the metal separator accumulating much reaction heat, by introducing a coolant into the middle portion, and a fuel cell stack having the same.

Yet another object of the present invention is to provide a metal separator for a fuel cell which further includes a coolant connection path for connecting a coolant inflow opening portion and a coolant outflow opening portion to a coolant channel, and a fuel cell stack having the same.

Yet another object of the present invention is to provide a metal separator for a fuel cell which includes a structure of preventing deformation of the metal separator by a fastening pressure in fastening of a fuel cell stack, and a fuel cell stack having the same.

Yet another object of the present invention is to provide a fuel cell stack which further includes a special support member for preventing deformation of a metal separator.

Technical Solution

There is provided a metal separator for a fuel cell, including: a reaction gas channel formed to protrude from a first face of the metal separator to a second face thereof; a coolant channel formed between the reaction gas channels protruding from the second face of the metal separator; a reaction gas manifold opened to introduce a reaction gas into the metal separator; a coolant manifold opened to introduce a coolant into the metal separator; and a stepped portion positioned at any one of the space between the reaction gas channel and the reaction gas manifold, and the reaction gas channel. This configuration serves to widen the reaction gas flowing portion and the coolant flowing portion on the metal separator, and prevent deformation of the reaction gas flowing portion and the coolant flowing portion, thereby improving efficiency of the fuel cell.

In another aspect of the present invention, the stepped portion is a coolant channel connection portion defined by the part of the reaction gas channel less protruding to the second face. In this configuration, the coolant flowing along the coolant channel can be easily introduced from one channel to its adjacent channel. Therefore, the flow of the coolant can be facilitated.

In yet another aspect of the present invention, the coolant channel connection portion is formed almost vertically to the coolant channel so that the coolant can flow in an almost vertical direction to the coolant channel on the second face of the metal separator. In this configuration, the coolant is introduced into one coolant channel through another coolant channel. As a result, the flow of the coolant can be facilitated.

In yet another aspect of the present invention, the reaction gas channel and the coolant channel have a serpentine structure. Especially, when the coolant channel connection portion of the metal separator is applied to the serpentine structure, it is possible to efficiently cool the metal separator accumulating much reaction heat at its middle region, and having the serpentine channel.

In yet another aspect of the present invention, the coolant channel connection portion is reduced in width toward the center portion of the metal separator. In this configuration, the coolant introduced into each coolant channel can be evenly dispersed through the coolant channel connection portion.

In yet another aspect of the present invention, the metal separator for the fuel cell further includes: a coolant inflow manifold for introducing the coolant into the metal separator; and a coolant outflow manifold for discharging the coolant from the metal separator. The coolant channel connection portion is formed in at least one of the coolant inflow manifold side and the coolant outflow manifold side.

In yet another aspect of the present invention, the metal separator for the fuel cell further includes a coolant connection path for connecting the coolant inflow manifold and the coolant outflow manifold to the coolant channel.

In addition, there is provided a fuel cell stack wherein a metal separator for a fuel cell and a membrane-electrode assembly are laminated in a plural number, each metal separator including: a reaction gas channel formed to protrude from a first face of the metal separator to a second face thereof; a coolant channel formed between the reaction gas channels protruding from the second face of the metal separator; and a coolant channel connection portion defined by the part of the reaction gas channel less protruding to the second face.

In yet another aspect of the present invention, a stepped portion is a protrusion opening having its one end opened, being formed between a reaction gas manifold and the reaction gas channel, and protruding to any one of the first and second faces. In this configuration, the protrusion opening serves to prevent deformation of the metal separator, and guide a reaction gas to smoothly flow into the metal separator.

In yet another aspect of the present invention, the protrusion opening includes a first protrusion opening protruding to the first face of the metal separator, and a second protrusion opening protruding to the second face thereof. This configuration prevents deformation of the metal separator and secures a wider gas inflow path.

In yet another aspect of the present invention, the first protrusion opening and the second protrusion opening are formed on a straight line in the same direction as that of the reaction gas introduced from the reaction gas manifold to the reaction gas channel. This configuration serves to prevent deformation of the metal separator and improve support effects.

In yet another aspect of the present invention, the first protrusion opening is positioned at the side of the reaction gas manifold, and the second protrusion opening is positioned at the side of the reaction gas channel.

In yet another aspect of the present invention, the protrusion opening is formed in a plural number in an almost normal line direction to the flow of the reaction gas.

There is also provided a fuel cell stack wherein a metal separator, a gasket adhered to first and second faces of the metal separator, and a membrane-electrode assembly positioned between the metal separators are laminated in a plural number, each metal separator including: a reaction gas channel formed to protrude from the first face of the metal separator to the second face thereof; a reaction gas manifold opened to introduce a reaction gas into the metal separator; and a protrusion opening having its one end opened, being formed between the reaction gas manifold and the reaction gas channel, and protruding to any one of the first and second faces.

In yet another aspect of the present invention, the protrusion opening is formed in a plural number in a normal line direction to the flow of the reaction gas.

In yet another aspect of the present invention, the fuel cell stack further includes a supplementary support member installed between the protrusion openings.

In yet another aspect of the present invention, the supplementary support member is made of a resin material having different hardness from that of the gasket.

In yet another aspect of the present invention, the metal separator includes a protruding gasket fixation portion, and the gasket includes a groove into which the gasket fixation portion is inserted.

In yet another aspect of the present invention, the metal separator includes a gasket fixation hole, and the gasket includes a protrusion portion inserted into the gasket fixation hole.

Advantageous Effects

In accordance with the present invention, the metal separator and the fuel cell stack having the same can improve the cooling performance, by including the coolant channel connection portion for enabling the coolant to flow between the parts of the coolant channel or between the coolant channels.

In accordance with the present invention, the metal separator and the fuel cell stack having the same can improve the cooling performance without increasing the thickness, area and volume of the separator, by forming the coolant channel connection portion by the stepped portion provided at the reaction gas channel.

In accordance with the present invention, the metal separator and the fuel cell stack having the same can reduce the manufacturing time and cost of the metal separator, by forming the coolant channel connection portion on the metal separator by a general stamping process.

In accordance with the present invention, the metal separator and the fuel cell stack having the same can improve the cooling efficiency, by intensively cooling the active heat generation part by controlling the amount of the coolant introduced into the coolant channel.

In accordance with the present invention, the metal separator and the fuel cell stack having the same can reduce a pressure drop amount by lowering flow resistance of the reaction gas, by including the structure of preventing deformation of the space to/from which the reaction gas is introduced and discharged.

In accordance with the present invention, the metal separator and the fuel cell stack having the same can improve stability and efficiency of the fuel cell system, by increasing airtightness by double sealing of the coolant portion and the reaction gas portion.

In accordance with the present invention, the metal separator and the fuel cell stack having the same can prevent deformation and separation of the gasket by a high fastening pressure, by including the gasket fixation portion.

In accordance with the present invention, the metal separator and the fuel cell stack having the same can surely prevent deformation of the metal separator and reduce deformation of the gasket, by including the supplementary support member.

BRIEF DESCRIPTION OF THE DRAWINGS

FIGS. 1 and 2 are views illustrating a second face of a metal separator in accordance with an embodiment of the present invention;

FIG. 3 is a view illustrating a bonding state of two metal separators in accordance with a preferred embodiment of the present invention;

FIG. 4 is a view illustrating a separator having a coolant inflow and outflow portion for guiding a coolant to a middle region of the separator in accordance with a preferred embodiment of the present invention;

FIG. 5 is a graph showing coolant flow rates in each region of the separator having the coolant inflow and outflow portion of FIG. 4 in accordance with the preferred embodiment of the present invention;

FIG. 6 is a view illustrating a first face of a metal separator in accordance with an embodiment of the present invention;

FIG. 7 is a view illustrating a fuel cell having a metal separator in accordance with an embodiment of the present invention; and FIG. 8 is a view illustrating a fuel cell stack including a metal separator having a protrusion opening in accordance with an embodiment of the present invention.

MODE FOR THE INVENTION

A metal separator for a fuel cell and a fuel cell stack having the same in accordance with the preferred embodiments of the present invention will now be described in detail with reference to the accompanying drawings.

FIGS. 1 and 2 are views illustrating a separator in accordance with a preferred embodiment of the present invention. The metal separator 100 includes a reaction gas manifold 130, a coolant manifold 120, a reaction gas channel 140, a coolant channel 150, a coolant channel connection portion 110, and a coolant channel connection path 112. In addition, a gasket 200 is adhered to the metal separator 100 so as to prevent leakage of a reaction gas and a coolant from the metal separator 100. The reaction gas manifold 130 serves to supply a reaction gas to the metal separator 100. Generally, the reaction gas manifold 130 is positioned at one side of the metal separator 100. The reaction gas introduced into the metal separator 100 through the reaction gas manifold 130 is guided by the reaction gas channel 140 formed on the metal separator 100. The reaction gas flows onto the surface of the metal separator 100 and reacts with an electrode (not shown). A GDL may be interposed between the metal separator 100 and the electrode (not shown).

The metal separator 100 made of a metal material is formed as a thin plate to reduce a volume of a fuel cell stack. The reaction gas channel 140 is formed on the metal separator 100 by a stamping process using a press machine. Here, the reaction gas channel 140 is formed to protrude from one face to the other face. That is, a groove portion of one face is a protrusion portion of the other face. Hereinafter, the face on which the reaction gas channel 140 becomes the groove portion is referred to as a reaction gas face, and the face on which the reaction gas channel 140 becomes the protrusion portion is referred to as a coolant face. A relatively concave groove portion between the protruding reaction gas channels 140 becomes the coolant channel 150 on the coolant face. A coolant introduced into the metal separator 100 through the coolant manifold 120 flows along the coolant channel 150 and cools reaction heat of the fuel cell.

In accordance with one embodiment of the present invention, when the reaction gas channel 140 and the coolant channel 150 are formed on the metal separator 100 by a stamping process, a stepped portion for securing passages of the reaction gas and the coolant is formed to protrude to a predetermined height that is lower than the height of the reaction gas channel 140. The stepped portion allows the reaction gas and the coolant to smoothly flow into the reaction gas channel 140 and the coolant channel 150, respectively.

For example, the coolant channel connection portion 110 defined by less protruding part of the reaction gas channel 140 is exemplified as a structure of securing the passage of the coolant. The coolant channel connection portion 110 connects the coolant channels 150 on the metal separator 100 so that the coolant can evenly flow in the whole coolant channels 150. Here, the reaction gas channel 140 and the coolant channel 150 can be formed in a single or plural number, respectively. When the reaction gas channel 140 and the coolant channel 150 are formed as one channel, respectively, the coolant channel connection portion 110 connects a few parts of the coolant channel 150 so that the coolant can evenly flow into each part. For instance, when the reaction gas channel 140 and the coolant channel 150 are formed in a serpentine shape, the coolant channel connection portion 110 is formed to connect each parallel part of the coolant channel 150. In addition, when the reaction gas channel 140 and the coolant channel 150 are formed as plural channels, respectively, the coolant channel connection portion 110 is formed to connect the plurality of parallel coolant channels 150. In this configuration, the coolant can smoothly move between the coolant channels 150. Accordingly, the cooling performance of the metal separator 100 can be improved.

The reaction gas channel 140 is formed to protrude to the other face. The coolant flows along the coolant channel 150 defined by the protruding shape of the reaction gas channel 140 on the other face, and cools the reaction heat of the metal separator 100. Therefore, the coolant introduced from the coolant manifold 120 through the coolant connection path 112 flows along a normal line direction of the coolant channel 150 near the coolant connection path 112. Here, the coolant channel connection portion 110 is defined by a step of the reaction gas channel 140. As the coolant channel connection portion 110 is formed, when the coolant introduced from the coolant manifold 120 flows along the normal line direction of the coolant channel 150 on the metal separator 100 having the serpentine channel, blockage of the coolant flow can be prevented. In addition, as the coolant channel connection portion 110 is defined by the reaction gas channel 140 and the step of the reaction gas channel 140, the coolant channel connection portion 110 is extended to the middle region of the metal separator 100. In this configuration, a large amount of coolant flows into the middle region of the metal separator 100, where a relatively large amount of reaction heat is generated, improving cooling efficiency. If the coolant channel connection portion 110 is formed at the outflow side of the coolant manifold 120 as well as the inflow side of the coolant manifold 120, cooling efficiency can be further improved. If the coolant discharged from the coolant manifold 120 also flows along the normal line direction of the coolant channel 150, the coolant may become stagnant.

FIG. 3 is a view illustrating a bonding state of two metal separators in accordance with one preferred embodiment of the present invention. The metal separators 100 (101 and 102) are laminated with their reaction gas channels 140 contact each other. A space secured by the non-protruding parts of the reaction gas channel 140 becomes a coolant channel 150. A part of the reaction gas channel 140 is provided with a less protruding step. Such a step becomes a coolant channel connection portion 110. On the metal separator 100 having the coolant channel 150—the reaction gas channel 140—the coolant channel 150, a coolant can pass between the metal separators 100 (101 and 102) through the coolant channel connection portion 110, and enter the adjacent coolant channel 150. In this configuration, the coolant channel connection portion 110 can be formed on the metal separator 100 without adding another process to a general stamping process. In addition, as the part of the reaction gas channel 140 of the metal separator 100 is less protruded, the whole thickness and volume of the metal separator 100 do not increase. Moreover, the metal separator 100 is efficiently cooled by smooth inflow and outflow of the coolant, to improve performance of a fuel cell.

In accordance with another preferred embodiment of the present invention, a step of a region between coolant channels 150 is defined by protruding one part more than the other part. Preferably, the protruding part is formed except front and rear sides of a coolant inflow and outflow portion so as to minimize interruption of a coolant flow. This embodiment is distinguished from the above-described embodiment in that the whole part except a protruding part of a reaction gas channel 140 (shown in FIG. 1) becomes a coolant channel connection portion 110.

FIG. 4 is a view illustrating a metal separator having a coolant inflow and outflow portion for guiding a coolant to a middle region of the metal separator in accordance with a preferred embodiment of the present invention. As shown in FIG. 4, when the metal separator 100 is divided into three regions, the outer regions of the metal separator 100 such as region 1 and region 3 can externally emit heat from a stack, but region 2, namely, the middle region of the metal separator 100 cannot easily externally emit heat from the stack, and thus accumulates much reaction heat. Here, a coolant channel connection portion 110 for guiding a coolant is formed on the metal separator 100 so that the flow rate of the coolant flowing into coolant channels 150 passing through region 2 can be larger than that of the coolant flowing into the other regions. That is, the coolant channel connection portion 110 is formed on reaction gas channels 140 with a predetermined length so that the coolant can be guided from the coolant channel 150 near a coolant inflow opening portion to the coolant channel 150 corresponding to the middle region. The flow of the coolant which is formed by the coolant channel connection portion 110 and which passes through the coolant channels 150 must be connected to the middle region without interruption. In the case of the serpentine channel of this embodiment, the coolant must flow from the coolant channel 150 formed at the side of the coolant inflow opening portion to the coolant channel 150 corresponding to the middle of the regions 2 and 3 without stagnancy. Accordingly, as illustrated in FIG. 1, the whole shape of the coolant channel connection portion 110 may be a triangle. In addition, the metal separator 100 further includes a connection path 112 for connecting a coolant manifold 120 to the coolant channel 150. The coolant connection path 112 is defined by a gasket 200 for sealing up the peripheral regions of the coolant manifold 120 and the coolant channel 150, and the metal separator 100. The coolant is introduced into the metal separator 100 through the coolant manifold 120, guided by the coolant connection path 112, and introduced into the coolant channel 150. Preferably, the coolant manifold 120 and the coolant connection path 112 are positioned closely to region 2, and the coolant channel connection portion 110 is made to be identical to the direction of the coolant introduced from the coolant connection path 112 as much as possible, so that the coolant is introduced into region 2 without interruption.

Here, the positions of the coolant manifold 120 and the coolant connection path 112 can be arbitrarily selected. In addition, the length, height and position of the coolant channel connection portion 110 formed on each reaction gas channel 140 can be arbitrarily selected. The amount of the coolant introduced into each coolant channel 150 can be controlled by adjusting the length, height and position of the coolant channel connection portion 110. The direction of the coolant passing through the coolant channels 150 can be controlled by adjusting the position of the coolant channel connection portion 110 in each reaction gas channel 140, namely, adjusting the whole shape of the coolant channel connection portion 110. Therefore, a large amount of coolant can be supplied to the necessary part, namely, the active reaction heat accumulation part, for improving cooling efficiency.

FIG. 5 is a graph showing coolant flow rates in each region of the separator having the coolant inflow and outflow portion of FIG. 4 in accordance with the preferred embodiment of the present invention. The cooling flow rates of each channel are estimated in a second channel of the separator by simulation. According to the simulation result, as shown in the graph, although the cooling flow rates have a deviation, the cooling flow rate of region 2 where relatively more reaction heat is accumulated is higher than that of the other regions. Accordingly, the same amount of coolant can more cool region 2 accumulating more reaction heat, which results in high cooling efficiency.

One example of a structure protruding to a predetermined height so as to secure a reaction gas passage and smoothly introduce a reaction gas will now be explained.

FIG. 6 is a view illustrating a first face of a metal separator in accordance with an embodiment of the present invention. The metal separator 100 includes a reaction gas manifold 130, a coolant manifold 120, a reaction gas channel 140, a coolant channel 150, a protrusion opening 160, a supplementary support member 170, and a gasket fixation portion 180. In addition, a gasket 200 for sealing up the reaction gas manifold 130, the coolant manifold 120, the reaction gas channel 140 and the coolant channel 150 is mounted on the metal separator 100.

A reaction gas sequentially flows along the reaction gas manifold 130, a reaction gas channel inlet 142, the reaction gas channel 140, a reaction gas channel outlet 144 and the reaction gas manifold 130. While passing through the reaction gas channel 140, the reaction gas performs oxidization or deoxidization in an MEA (not shown). As another example of a stepped portion, the protrusion opening 160 is provided in a space between the reaction gas manifold 130 and the reaction gas channel 140. Deformation of the metal separator 100 is prevented by protrusion of the protrusion opening 160. The reaction gas is introduced into the reaction gas channel 140 through the protrusion opening 160. The protrusion opening 160 is formed by cutting part of the metal separator 100 and protruding the cut part and the peripheral part to one face. As identical to the reaction gas channel 140 of the metal separator 100, the protrusion opening 160 can be formed by a stamping process.

The protrusion opening 160 may include a first protrusion opening 162 protruding to the reaction gas face. More preferably, the protrusion opening 160 may include a first protrusion opening 162 protruding to the reaction gas face, and a second protrusion opening 164 protruding to the coolant face. The space between the first protrusion opening 162 and the second protrusion opening 164 is cut. Referring to FIG. 7, as compared with a case in which the protrusion opening 160 includes only the first protrusion opening 162, when the protrusion opening 160 includes both the first protrusion opening 162 and the second protrusion opening 164, the inflow space of the reaction gas can be widened. Moreover, as both faces of the metal separator 100 are provided with the protrusion portions, deformation of the metal separator 100 can be efficiently prevented.

More preferably, the protrusion opening 160 is formed in a plural number between the reaction gas manifold 130 and the reaction gas channel 140 in a normalline direction to the flow of the reaction gas. As compared with one protrusion opening 160, the plurality of protrusion openings 160 can improve resistance of the metal separator 100 to a fastening pressure. In addition, as compared with a case in which the protrusion opening 160 is integrally formed, the supplementary support member 170 discussed later can be easily installed.

The supplementary support member 170 is installed in gaps between the plurality of protrusion openings 160. The supplementary support member 170 can prevent deformation of the metal separator 100 which cannot be completely prevented by the protrusion openings 160. The supplementary support member 170 serves to guide the reaction gas to the reaction gas channel 140.

More preferably, the supplementary support member 170 is made of a resin material having different hardness from that of the gasket 200. In stack fastening, not only the metal separator 100 but also the gasket 200 may be deformed due to a highfastening pressure. If the supplementary support member 170 has different hardness from that of the gasket 200, the supplementary support member 170 and the gasket 200 have different deformation degrees. It is thus possible to increase resistance to deformation of the gasket 200.

In addition, the supplementary support member 170 can be installed between the reaction gas manifold 130 of another reaction gas which is not introduced into the metal separator 100 and the coolant channel 150. The supplementary support member 170 is installed in the gasket 200 for sealing up the reaction gas manifold 130 on the coolant face of the metal separator 100. In this case, the supplementary support member 170 does not guide the reaction gas into the reaction gas channel (not shown), but increases resistance to deformation of the gasket 200.

The solid gasket 200 manufactured in advance according to the shapes of the manifold 130 and the channels 140 and 150 of the metal separator 100 can be adhered to the metal separator 100. In addition, the gasket 200 can be directly coated and manufactured on the metal separator 100 by injection molding. When the gasket 200 is manufactured by injection molding, if the supplementary support member 170 is manufactured by injection molding, a special adhering method and process are not required. As a result, the manufacturing time of the fuel cell can be reduced.

The metal separator 100 includes the gasket fixation portion 180 between the gaskets 200. More preferably, the gasket fixation portion 180 includes a gasket fixation portion 182 protruding to the reaction gas face, and a gasket fixation portion 184 protruding to the coolant face, for preventing separation of the gasket 200 mounted on the reaction gas face and the gasket 200 mounted on the coolant face. The gasket fixation portion 180 can be press-formed like the channels 140 and 150 and the protrusion opening 160.

In accordance with a preferred embodiment of the present invention, the gaskets 200 for sealing up the reaction gas manifold 130, the coolant manifold 120, and the reaction gas channel 140 are separately formed. Therefore, as shown in FIG. 6, double sealing is conducted between the reaction gas manifold 130 and the protrusion opening 160 on the first face. As depicted in FIG. 1, double sealing is also conducted between the protrusion opening 160 and the coolant channel 150. Accordingly, air can more effectively be kept from the reaction gas and the coolant. FIG. 7 shows a double sealing process for any of the coolant face and the reaction gas face.

FIG. 8 is a view illustrating a fuel cell stack including a metal separator having a protrusion opening in accordance with an embodiment of the present invention. A reaction gas is introduced from a reaction gas storage tank (not shown) through a reaction gas manifold 130. While flowing along the reaction gas manifold 130, the reaction gas flows from one unit cell to its adjacent unit cell, and flows along the metal separator 100 of the unit cell. The reaction gas is guided to a protrusion opening 160 by a supplementary support member 170 adhered to the metal separator 100. The reaction gas flows to a reaction gas channel 140 through a space secured by the protrusion opening 160.

As described above, the coolant channel connection portion 110 (shown in FIG. 2) for securing the passage of the coolant, and the protrusion opening 160 (shown in FIG. 6) for securing the passage of the reaction gas can be formed together by the stamping process for forming the reaction gas channel 140 (shown in FIG. 2) and the coolant channel 150 (shown in FIG. 2). As a result, the structure of smoothly introducing the coolant and the reaction gas into the metal separator 100 (shown in FIG. 1) can be formed without requiring an additional process and increasing the manufacturing time.

Although the preferred embodiments of the present invention have been described, it is understood that the present invention should not be limited to these preferred embodiments but various changes and modifications can be made by one skilled in the art within the spirit and scope of the present invention as hereinafter claimed.

The invention claimed is:

1. A metal separator for a fuel cell, comprising:
a reaction gas channel formed to protrude from a first face of the metal separator to a second face thereof;
a coolant channel defined by the reaction gas channel and protruding from the second face of the metal separator;
a reaction gas manifold configured to introduce a reaction gas into the metal separator; and
a coolant inflow manifold configured to introduce a coolant into the metal separator,
wherein the reaction gas channel comprises a stepped portion to form a coolant channel connection portion, and
wherein the coolant passes across the reaction gas channel through the coolant channel connection portion.

2. The metal separator of claim 1, wherein the coolant channel connection portion is formed almost perpendicular to the coolant channel so that the coolant can flow in an almost perpendicular direction to the coolant channel.

3. The metal separator of claim 1, wherein the reaction gas channel and the coolant channel have a serpentine structure.

4. The metal separator of claim 1, wherein the coolant channel connection portion has a width that is reduced in a center portion of the metal separator.

5. The metal separator of claim 1, the metal separator further comprising:
a coolant outflow manifold configured to discharge the coolant from the metal separator,
wherein the coolant channel connection portion is coupled to any of the coolant inflow manifold and the coolant outflow manifold.

6. The metal separator of claim 5, further comprising a coolant connection path configured to couple any of the coolant inflow manifold and the coolant outflow manifold to the coolant channel.

7. The metal separator of claim 1, wherein the stepped portion is a protrusion opening having one end open, being formed between the reaction gas manifold and the reaction gas channel, and protruding from any of the first and second faces.

8. The metal separator of claim 7, wherein the protrusion opening comprises a first protrusion opening protruding from the first face of the metal separator, and a second protrusion opening protruding from the second face thereof.

9. The metal separator of claim 8, wherein the first protrusion opening and the second protrusion opening are formed along a straight line in a same direction as that of the reaction gas introduced from the reaction gas manifold to the reaction gas channel.

10. The metal separator of claim 9, wherein the first protrusion opening is positioned at a side of the reaction gas manifold, and the second protrusion opening is positioned at a side of the reaction gas channel.

11. The metal separator of claim 7, wherein the protrusion opening is configured to introduce the flow of the reaction gas in the same direction as the reaction gas channel.

12. A fuel cell stack wherein a metal separator for a fuel cell and a membrane-electrode assembly are laminated in a plural number, each metal separator comprising:
a reaction gas channel formed to protrude from a first face of the metal separator to a second face thereof; and
a coolant channel defined by the reaction gas channel and protruding from the second face of the metal separator,
wherein the reaction gas channel comprises a stepped portion to form a coolant channel connection portion, and
wherein a coolant passes across the reaction gas channel through the coolant channel connection portion.

13. A fuel cell stack wherein a metal separator, a gasket adhered to first and second faces of the metal separator, and a membrane-electrode assembly positioned between the metal separators are laminated, each metal separator comprising:
a reaction gas channel formed to protrude from the first face of the metal separator to the second face thereof, the reaction gas channel comprising a stepped portion to form a coolant channel connection portion so that a coolant passes across the reaction gas channel through the coolant channel connection portion;
a reaction gas manifold configured to introduce a reaction gas into the metal separator; and
a protrusion opening configured to couple the reaction gas manifold and the reaction gas channel.

14. The fuel cell stack of claim 13, wherein the protrusion opening is configured to introduce the flow of the reaction gas in the same direction as the reaction gas channel.

15. The fuel cell stack of claim 14, further comprising a supplementary support member installed between the protrusion openings.

16. The fuel cell stack of claim 15, wherein the supplementary support member is formed of a resin material having a different hardness from that of the gasket.

17. The fuel cell stack of claim 13, wherein the metal separator comprises a protruding gasket fixation portion, and the gasket comprises a groove into which the gasket fixation portion is inserted.

18. The fuel cell stack of claim 13, wherein the metal separator comprises a gasket fixation hole, and the gasket comprises a protrusion portion inserted into the gasket fixation hole.

* * * * *